(12) United States Patent
Guardiola et al.

(10) Patent No.: US 11,309,774 B2
(45) Date of Patent: Apr. 19, 2022

(54) ELECTRIC MOTOR WITH BUSBAR UNIT

(71) Applicant: Nidec Corporation, Kyoto (JP)

(72) Inventors: Pascual Guardiola, Bietigheim-Bissingen (DE); Thomas Kübler, Untergruppenbach (DE)

(73) Assignee: NIDEC CORPORATION, Kyoto (JP)

( * ) Notice: Subject to any disclaimer, the term of this patent is extended or adjusted under 35 U.S.C. 154(b) by 387 days.

(21) Appl. No.: 16/590,476

(22) Filed: Oct. 2, 2019

(65) Prior Publication Data

US 2020/0212768 A1    Jul. 2, 2020

(30) Foreign Application Priority Data

Jan. 2, 2019  (DE) ............... 10 2019 100 020.3

(51) Int. Cl.
  *H02K 11/40* (2016.01)
  *H02K 3/52* (2006.01)
(52) U.S. Cl.
  CPC ............ *H02K 11/40* (2016.01); *H02K 3/522* (2013.01); *H02K 2203/09* (2013.01)
(58) Field of Classification Search
  CPC .... H02K 5/225; H02K 11/40; H02K 15/0062; H02K 15/0068; H02K 2203/09

USPC .......................................................... 310/71
See application file for complete search history.

(56) References Cited

U.S. PATENT DOCUMENTS

2007/0278876 A1* 12/2007 Haga .................. H02K 3/325
                                                         310/71
2015/0381018 A1* 12/2015 Crowther ............... H02K 11/40
                                                         310/68 R

FOREIGN PATENT DOCUMENTS

EP     2 911 278 A2    8/2015
EP     E P-2911278 A2 *  8/2015 ........... F04D 13/064

* cited by examiner

*Primary Examiner* — Quyen P Leung
*Assistant Examiner* — Minki Chang
(74) *Attorney, Agent, or Firm* — Keating & Bennett

(57) ABSTRACT

An electric motor includes a rotor rotatable about a rotation axis, and a stator that externally surrounds the rotor and includes a stator core and coils wound on the stator core. The windings are defined by a winding wire including winding wire end portions that are electrically contacted at end surfaces thereof by busbars held at least partially in a busbar holder, and include a ground contact to connect the stator to a ground potential. The ground contact includes a first end region received in a longitudinal groove on an outside of the stator core.

13 Claims, 3 Drawing Sheets

ELECTRIC MOTOR WITH BUSBAR UNIT

CROSS REFERENCE TO RELATED APPLICATION

The present invention claims priority under 35 U.S.C. § 119 to German Application No. 10 2019 100 020.3 filed on Jan. 2, 2019, the entire contents of which application are hereby incorporated herein by reference.

FIELD OF THE INVENTION

The present disclosure relates to an electric motor.

BACKGROUND

Brushless DC motors of the type relevant here are referred to as internal rotors and have a rotor which is connected to a motor shaft and is rotatably mounted in a housing. The rotor is provided with permanent magnets. A stator is arranged around a motor, which stator bears a number of windings on an iron core. With suitable control, the windings generate a magnetic field that drives the rotor for rotation. The windings are usually wound three-phase and are accordingly provided with three electrical connections, via which the windings can be connected to a control unit (ECU). At low power levels, the busbars can be designed as circuit board films. At higher power levels, as assumed here, the winding connection wires are contacted via busbars made of copper.

For the purpose of the geometric description of the electric motor, the axis of rotation of the motor is assumed to be the central axis and the axis of symmetry. The stator is arranged concentrically with the axis of rotation and the rotor. The axis of rotation simultaneously defines a longitudinal axis. A radial direction with respect to the central axis is also mentioned, which indicates the distance from the central axis as well as from a circumferential direction, which is tangential to a certain radius arranged in the radial direction. The terminal side of the stator, where the winding wires are connected to the busbar assembly, will be described as the upper side of the stator.

If electrical step signals, which are intended to emulate, for example, a sinusoidal drive characteristic as accurately as possible, are generated to control the phases, in particular when using pulse width modulation in the kHz to MHz range, radiation of electromagnetic waves in the region of the windings and the leads must be expected. The radiation is to be regarded as critical with respect to the electromagnetic compatibility (EMC) of the DC motor and the surrounding electronics, when installing the DC motor in a motor vehicle. Therefore, the demand for increased electromagnetic compatibility or the lowest possible transmission activity is becoming more and more important. Accordingly, these brushless DC motors are suitable for suppressing interference.

Conventionally, metallic housings have been used for shielding.

Without metallic housings, the possibility of electrically contacting capacitors to a motor housing when the housing is electrically non-conductive is eliminated. EP 2 911 278 A2 discloses a centrifugal pump motor having a negative and a positive electrical connection, which are electrically connected to the stator core via a Y-capacitor. An embodiment for contacting the stator consists of an electrical connection between the printed circuit board and the stator core, which is produced via a contact means. In this case, the electrical connecting lines to the Y-capacitors are provided in the printed circuit board layout of the printed circuit board, and the Y-capacitors are arranged on the printed circuit board. The contact means is received in a conductor channel of an insulating material body in the interior of the stator core.

SUMMARY

Example embodiments of the present disclosure reduce, minimize or prevent generation of disruptive electromagnetic radiation signals by effectively connecting components or portions of an electric motor to a ground potential. Such a ground connection is as simple as possible, reliable and easy to assemble.

According to an example embodiment of the present disclosure, an electric motor includes a rotor rotatable about an axis of rotation, and a stator that externally surrounds the rotor and includes a stator core and coils wound on the stator core, wherein the coils are defined by a winding wire having winding wire end portions, and the winding wire end portions are electrically contacted at the end surfaces thereof by busbars that are held at least partially in a busbar holder, and including a ground contact to connect the stator to a ground potential, and the ground contact includes a first end region received in a longitudinal groove on an outside of the stator core. The ground contact establishes a connection with the stator in a simple and reliable manner. One of the longitudinal grooves in the stator core is used for the contacting.

Preferably, the ground contact includes a portion of the busbar holder. It is advantageous if the busbar holder is molded in an injection molding process and the ground contact is overmolded by the plastics material. Since the ground contact is integrated in the busbar holder, the ground contact is easily introduced into the longitudinal groove when placing the busbar holder on an upper side of the stator.

To introduce the ground contact into the longitudinal groove, the ground contact preferably has a press-in contact portion with at least one jagged side surface in the first end region. Preferably, a solid press connection is thus able to be produced.

In a second end region opposite the first end region, the ground contact preferably includes a portion, in particular a press-fit portion with a press-fit pin, for fixed connection to a printed circuit board carrying a controller.

Preferably, two end regions of the ground contact are interconnected via a bent portion. But it is also possible that the two end regions lie in a common plane and the ground contact is thus straight or flat.

In an advantageous example embodiment, the first and the second end region of the ground contact extend in the installed state parallel or substantially parallel to the longitudinal axis of the electric motor.

For ease of manufacture, it is possible that the ground contact is a punched-out and reshaped guide plate.

Preferably, the stator core includes a stack of sheets electrically insulated from one another, and the ground contact electrically interconnects at least about 10% of all the individual sheets of the stator core.

The busbar holder is preferably attached to the upper side of the stator.

The coils are preferably surrounded in the direction of the radius on the outside by a positioner on which the busbar holder is held.

An electric motor according to an example embodiment of the present disclosure preferably includes a non-conductive motor housing including a plastics material that is able to be processed by injection molding.

The above and other elements, features, steps, characteristics and advantages of the present disclosure will become more apparent from the following detailed description of the example embodiments with reference to the attached drawings.

BRIEF DESCRIPTION OF THE DRAWINGS

Example embodiments of the present disclosure are described below in more detail with reference to the drawings. Similar or equivalent components are denoted by the same reference numerals in the figures. In the drawings.

DETAILED DESCRIPTION

Figure 1:
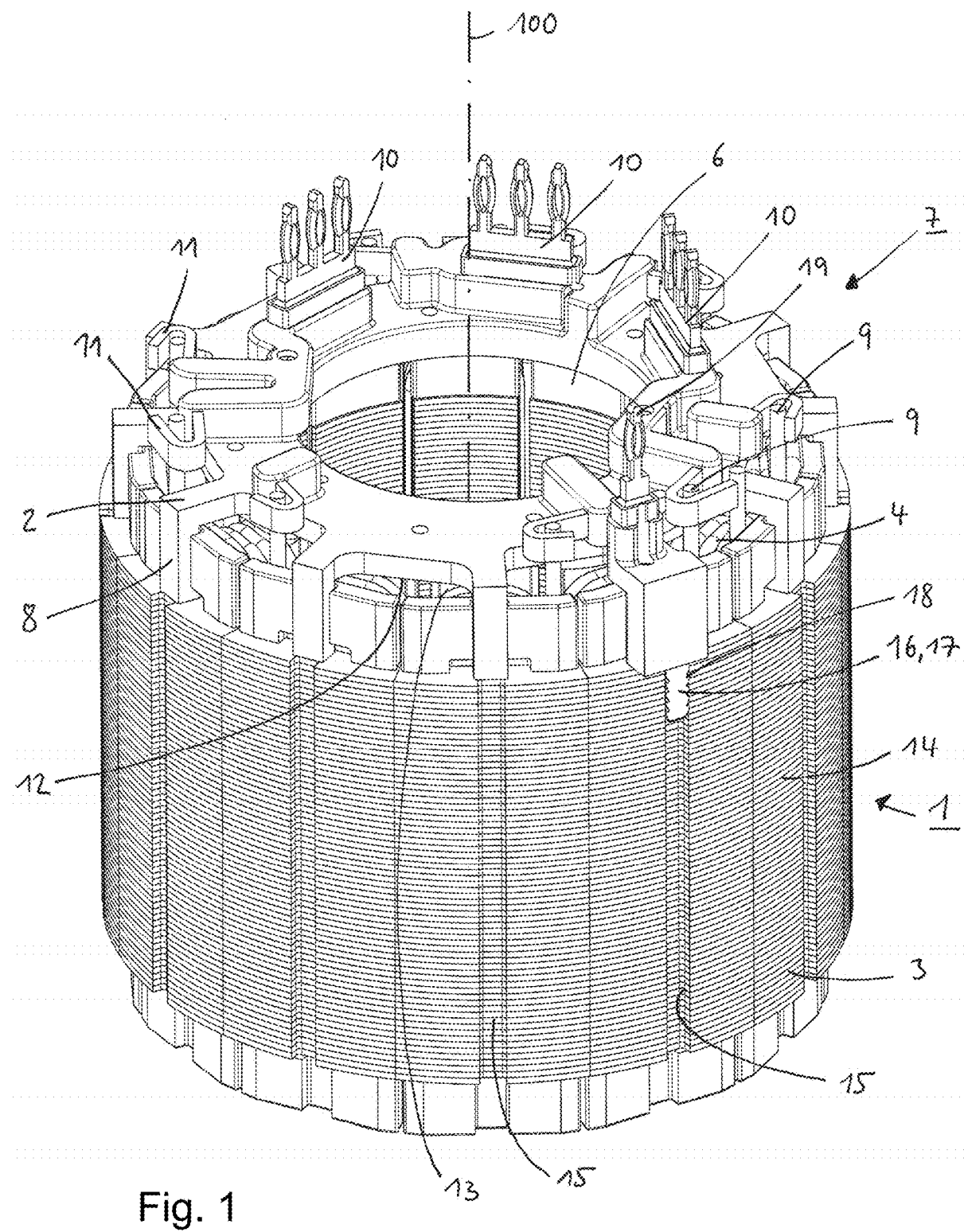
FIG. 1 is a perspective view of a stator of a brushless DC motor with busbar unit and ground contact.

FIG. 1 shows a stator 1 with a mounted, substantially ring-shaped busbar holder 2. The stator 1 has a stator core 3 which extends coaxially to a longitudinal axis 100 and has a plurality of stator core segments, not shown, around which coils 4 are respectively wound. The coils 4 are only shown schematically. The coils 4 are viewed in the direction of the radius, surrounded on the outside by a positioner 5. The positioner 5 may be made of an electrically insulating material to avoid short circuits between winding wires of different phases. The stator core segments are arranged sequentially in the circumferential direction of the stator 1. The stator core segments may be at least partially made of a ferromagnetic material, such as ferromagnetic steel. The stator 1 is fixedly mounted within a housing of an electric motor and is configured to generate a time-varying magnetic field by means of the coils 4. A magnetized rotor (not shown) is thereby mounted in the central opening 6 of the stator 1. It is configured to be rotated by an interaction with the time-varying magnetic field generated by the coils 4. A busbar unit 7 is configured to electrically contact the coils 4 of the stator by means of busbars (not shown). The busbar unit 7 comprises the busbar holder 2 and busbars held on the busbar holder 2. The busbars are made of an electrically conductive material, preferably metal, in particular copper. The busbar holder 2 at least partly or entirely comprises an electrically insulating material, so that short circuits between the busbars can be effectively prevented. The busbar holder 2 is preferably made by injection molding and extends over at least a part of the busbars. In this way, a fixed and well-defined physical connection between the busbar holder 2 and the busbars can be provided. The busbar holder 2 is configured to be positioned on an axial side of the stator (upper side).

The busbar unit 7 has circumferentially equally spaced arms 8, which are angled at their ends and lie with their ends in abutment with the positioner 5 for attachment to the stator 1, and are preferably clipped. The coils 4 are grouped into three phase groups U, V, W. The coils of the respective phase groups U, V, W are formed by a winding wire which is wound around the corresponding stator core segments of the stator core 3 and which can be connected to a power source by means of winding wire end portions 9. For this purpose, each of the busbars has a power source connection terminal element 10 configured to be electrically connected to a power source, as well as a plurality of coil connection terminal elements 11 respectively configured to be electrically connected to a coil of the stator.

The coil connection terminal elements 11 have a substantially U-shaped or V-shaped configuration and extend in a plane perpendicular to the longitudinal axis 100. In other words, the coil connection terminal elements 11 have a U-shaped or V-shaped profile in cross section with respect to the longitudinal axis 100 and respectively surround a winding wire end portion 9 extending substantially parallel to the longitudinal direction.

The coil connection terminal elements 11 are preferably formed as crimping elements, which are crimped around the winding wire end portions 9. In this way, the winding wire end portions 9 could be electrically connected electrically to the busbar simply by mechanical deformation of the respective coil connection terminal elements 11. The busbar holder 2 has a stator surface 12, which is in contact with the end surface of the stator (upper side) 13.

In order to ensure a high degree of electromagnetic compatibility, it is desirable to connect the stator to a ground potential securely and via the lowest possible electrical resistance. A ground contact 16 connects the stator core 3 directly to a ground element or ground contact of a control unit, not shown, arranged on a printed circuit board. The stator core 3 has packaged stator sheets 14. The stator core 3 and the stator sheets 14 are grooved on the outside. The grooves 15 are longitudinal grooves. They extend in the longitudinal direction, preferably over the entire height of the stator core and are arranged uniformly spaced along the circumference. The ground contact 16 is received in a longitudinal groove 15. The ground contact 16 has a press-in contact portion 17 in a first end region, which is provided with a jagged contour, in particular barbs 18, in order to be able to engage into a longitudinal groove 15 of the stator for producing a press connection. The press-in contact portion 17 is flat, in particular sheet-like, wherein the side surface bears the jagged or toothed surface along the longitudinal direction.

Figure 2:
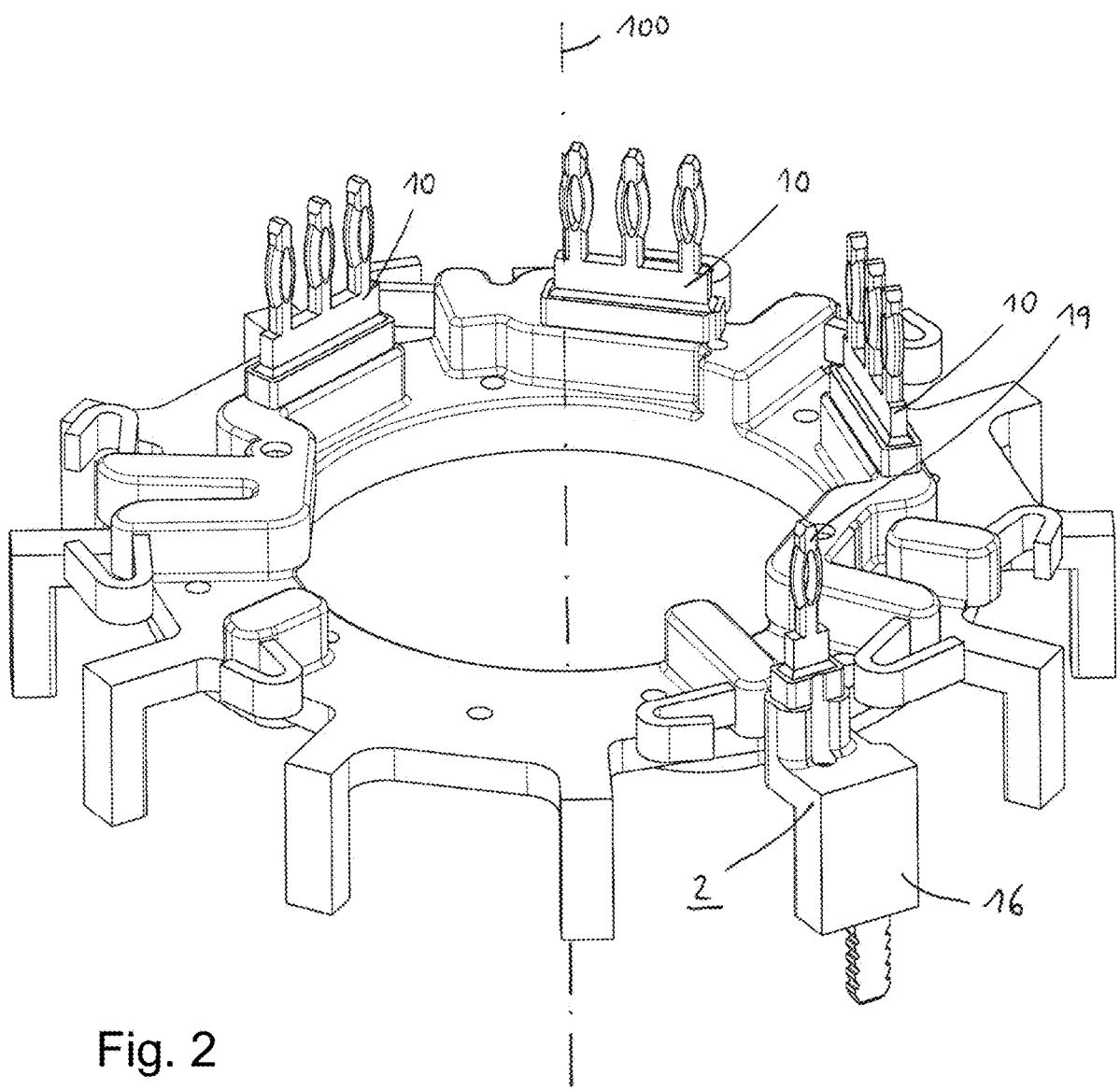
FIG. 2 is a perspective view of a busbar unit with ground contact.
Figure 3:
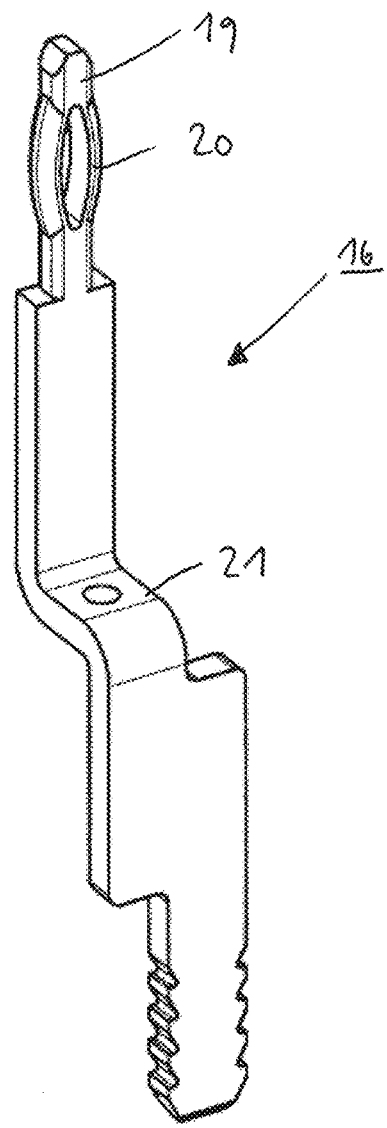
FIG. 3 is a perspective view of the ground contact.

As shown in detail in FIGS. 2 and 3, in a second end region opposite the first end region, the ground contact 16 has a press-fit portion 19 for rigid connection to the circuit board. The press-fit portion 19 has a press-fit pin 20 which has a greater extent in a press-fit zone compared to a hole in the circuit board. When pressing in, the press-fit pin is plastically deformed and ensures a gas-tight contact with low resistance to the circuit board. Only low insertion forces are necessary with simultaneously high holding forces. The two end regions of the ground contact 16 are interconnected via a bent portion 21. The ground contact 16 is integrated into the busbar holder 2. Preferably, in the production of the busbar holder 2, the ground contact 16 is at least partially overmolded, while the two end regions project beyond the injection molded part. The first and the second end region of the ground contact 16 extend parallel to the longitudinal axis 100 in the installed state.

The ground contact allows the stator to connect reliably to a ground potential or the circuit board via the lowest possible electrical resistance. This simplifies the assembly process. When placing the busbar unit on the top of the stator, the ground contact is pressed into the longitudinal groove in the longitudinal direction and a secure connection is made. The circuit board of the control unit is preferably connected to the busbar unit via press-fit technology. The power source connection terminal elements 10 and the press-fit portion 19 of the ground contact 16 are aligned parallel to the longitudinal axis 100, so that they can be guided in a simple manner through corresponding openings of a printed circuit board and connected to this for electrical contact. The printed circuit board preferably extends parallel to the upper side of the stator or of the busbar holder.

The stator with busbar unit can be installed in an electric motor, not shown. The electric motor is preferably used in the automotive sector, in particular in a pump, preferably an electric oil pump.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An electric motor, comprising:
   a rotor that is rotatable about a rotation axis; and
   a stator that externally surrounds the rotor and includes a stator core and coils wound on the stator core; wherein
   the coils are defined by a winding wire including winding wire end portions being electrically contacted at end surfaces thereof by busbars held at least in part in a busbar holder, and including a ground contact to connect the stator to a ground potential; and
   the ground contact includes a first end region received in a longitudinal groove on an outside of the stator core.

2. The electric motor according to claim 1, wherein the ground contact includes a portion of the busbar holder.

3. The electric motor according to claim 1, wherein the busbar holder is made of an injection molded material, and the ground contact is overmolded by the injection molded material.

4. The electric motor according to claim 1, wherein the ground contact includes a press-in contact portion including at least one jagged lateral surface in the first end region.

5. The electric motor according to claim 1, wherein the ground contact includes a portion for rigid connection to a printed circuit board of a controller in a second end region opposite to the first end region.

6. The electric motor according to claim 5, wherein the portion is a press-fit portion including a press-fit pin.

7. The electric motor according to claim 5, wherein the first and second end regions of the ground contact are interconnected by a bent portion.

8. The electric motor according to claim 5, wherein the first and second end regions of the ground contact extend parallel or substantially parallel to a longitudinal axis of the electric motor.

9. The electric motor according to claim 1, wherein the ground contact includes a guide plate.

10. The electric motor according to claim 1, wherein the stator core includes a stack of sheets that are electrically insulated from one another in a planar manner, and the ground contact electrically interconnects at least 10% of all of the sheets in the stack of sheets.

11. The electric motor according to claim 1, wherein the busbar holder is attached to an upper side of the stator.

12. The electric motor according to claim 1, wherein the coils are surrounded by a positioner on an outside when viewed in the direction of a radius and the busbar holder is held on the positioner.

13. The electric motor according to claim 1, further comprising a non-conducting motor housing including a plastics material.

* * * * *